United States Patent [19]

Maekawa et al.

[11] Patent Number: 5,315,678
[45] Date of Patent: May 24, 1994

[54] OPTICAL FIBER CONNECTOR

[75] Inventors: Koichiro Maekawa, Ichinomiya; Takashi Ota, Kasugai; Masashi Fukuyama, Nagoya; Shinji Nagasawa, Mito, all of Japan

[73] Assignees: Nippon Telegraph & Telephone Corporation; NGK Insulators, Ltd., Japan

[21] Appl. No.: 37,007

[22] Filed: Mar. 25, 1993

[30] Foreign Application Priority Data

| Mar. 30, 1992 | [JP] | Japan | 4-17751 |
| Mar. 30, 1992 | [JP] | Japan | 4-17752 |
| Mar. 30, 1992 | [JP] | Japan | 4-74149 |

[51] Int. Cl.$^5$ ............................................. G02B 6/40
[52] U.S. Cl. ..................................... 385/59; 385/63; 385/65
[58] Field of Search .......... 385/54, 59, 63, 65, 385/83, 115, 116, 120, 121

[56] References Cited

U.S. PATENT DOCUMENTS

| 4,818,058 | 4/1989 | Bonanni | 385/59 |
| 4,818,059 | 4/1989 | Kakii et al. | 385/83 |
| 4,973,127 | 11/1990 | Cannon, Jr. et al. | 350/96.22 |

FOREIGN PATENT DOCUMENTS 3-61916  3/1991 Japan.
3-86308  8/1991 Japan.
3-179405 8/1991 Japan.
4-29207  1/1992 Japan.

OTHER PUBLICATIONS

Toshiaki Sakete et al., *Ultra High Density 50–Fiber Connector*, The Transactions of the IEICE, vol. E 70, No. 7, pp. 621–622, Jul. 1987.

*Primary Examiner*—Rodney B. Bovernick
*Assistant Examiner*—John Ngo
*Attorney, Agent, or Firm*—Parkhurst, Wendel & Rossi

[57] ABSTRACT

Disclosed is an optical fiber connector for a plurality of covered optical fibers, including (a) a lower ceramics plate with a top plane surface having a plurality of V-grooves, each groove for respectively holding one fiber, (b) an upper plate, in spaced apart combination with the lower plate, for firmly holding the optical fibers in the lower plate grooves, and (c) a holder having two opposed end portions in which (i) a first cavity is profiled in the first end portion to accommodate the combination of the upper and lower plates, and (ii) a second cavity is profiled in the second end portion to accommodate the covered fibers, and wherein the first cavity has a connection portion proximate to an inner end of the second cavity, which connects the first and second cavities to provide a through passage for the fibers.

10 Claims, 16 Drawing Sheets

OPTICAL FIBER CONNECTOR

BACKGROUND OF THE INVENTION

1. Field of the Invention

The present invention relates to an optical fiber connector, and more particularly, to an optical fiber connector for collectively connecting a plurality of optical fibers together.

2. Description of the Related Art

In an optical fiber communication system, an optical fiber connector is used to connect optical fibers together. There are conventionally known optical fiber connectors such as a multi-core optical fiber connector for collectively joining a plurality of optical fibers together, in addition to a single-core optical fiber connector. FIG. 1 shows a general multi-core optical fiber connector. Tip ends of the optical fibers 62, 62 in tape-like optical fiber cables 60, 60 are collectively connected together by such multi-core optical fiber connector.

The multi-core optical fiber connector comprises a lower plate 10 and a holding plate 80. The lower plate 10 is provided with a plurality of V-grooves 12 formed therein for accommodating the plurality of optical fibers 62 in an arranged manner, and an accommodation groove 16 defined to communicate with ends of the V-grooves 12 for disposition of a covering portion 64 of the optical fiber cable 60. Alignment grooves 14 are defined on both sides of the V-grooves 12 for respectively holding alignment pins (not shown) to position the lower plates 10 relative to each other. The holding plate 80 is provided with an accommodation groove 84 corresponding to the accommodation groove 16, and alignment grooves 82 corresponding to the alignment grooves 14.

The optical fibers 62 are disposed in the V-grooves 12 in the lower plate 10, and the covering portion 64 of the optical fiber cable 60 is disposed in the accommodation groove 16. In this condition, the holding plate 80 is laid on the lower plate 10, and the lower plate 10, the holding plate 80, the covering portion 64 and the optical fibers 62 are integrally secured together by use of an adhesive. The multi-core optical connectors are positioned by means of the alignment pins (not shown) integrally inserted into the alignment grooves 14 and 8, with the end faces of the optical fibers 62 being connected together.

In such a multi-core optical connector, it is necessary to reduce variations in connection loss due to misalignment of the optical fibers 62 and due to a variation in temperature, as much as possible. For this reason, it has been proposed to make lower plate 10 and the holding plate 80 of ceramics, to cut the V-grooves 12 and the alignment grooves 14 with high machining accuracy in the lower ceramic plate 10, and to cut the alignment grooves 82 with high machining accuracy in the ceramics holding plate 80.

When the lower ceramics plate 10 is machined, however, the V-grooves 12 are first made in the entire upper surface of the lower ceramics plate 10 and then, the portions of the V-grooves 12 corresponding to a section for accommodating the covering portion 64 and an upper portion of the lower ceramics plate 10 are removed by counterboring, thereby providing the accommodation groove 16.

A significantly long time is required for performing this counterboring, thereby causing a considerably increased machining cost for the lower ceramics plate 10, resulting in an expensive multi-core optical connector as a whole. Moreover, the accommodation groove 16 is adapted for merely accommodating the covering portion 64 therein and is not a portion requiring accuracy, and nevertheless, it accounts for a significant portion of the machining cost for the lower ceramics plate 10. Further, it is necessary to define the V-grooves 12 first in the entire surface of the lower ceramics plate including a section corresponding to the accommodation groove 16 which will be removed later, and hence, an unnecessary machining cost is taken even for provision of the V-grooves 12.

SUMMARY OF THE INVENTION

Accordingly, it is an object of the present invention to provide an optical fiber connector which enables a plurality of optical fibers to be connected together with high accuracy and which can be manufactured at a low cost.

According to the present invention, there is provided an optical fiber connector for a plurality of covered optical fibers, comprising:

(a) a lower ceramics plate with a top plane surface having a plurality of V-groves, each groove for respectively holding one fiber;

(b) an upper plate, in spaced apart combination with the lower plate, for firmly holding the optical fibers in the lower plate grooves; and (c) a holder having two opposed end portions in which:
   (i) a first cavity is profiled in the first end portion to accommodate the combination of the upper and lower plates; and
   (ii) a second cavity is profiled in the second end portion to accommodate the covered fibers, and wherein the first cavity has a connection portion proximate to an inner end of the second cavity, which connects the first and second cavities to provide a through passage for the fibers.

In the present invention, because the V-grooves are provided in the lower ceramics plate, the V-grooves can be machined with high accuracy. Therefore, it is possible to inhibit the generation of a connection loss and a variation in connection loss due to a variation in temperature.

In addition, because the cavity for accommodation of the fiber covering portion is provided in the holder rather than in the lower ceramics plate, the machining for provision of the cavity in the lower ceramics plate is no longer required, thereby providing a reduced machining cost for the optical fiber connector.

Preferably, the connector further comprises narrowing means disposed in the connection portion above the lower plate, for narrowing the cross section of the connection portion, whereby the fibers are loosely held in place in the grooves.

By providing the narrowing means within the first cavity in the vicinity of the inner end of the second cavity in this manner, the optical fibers can be loosely held and temporarily fixed by the narrowing means. Therefore, there is eliminated the need for temporarily fixing the optical fibers by an adhesive tape, a double-sided adhesive tape or the like before the optical fibers are firmly held within the V-grooves by the upper plate, thereby ensuring that the optical fibers can be easily fixed.

The narrowing means may comprise a portion of the lower plate grooves and an upper holding means disposed thereabove by a distance less than the diameter of the optical fiber, so as to narrow the cross-sectional area of the connection portion.

The upper holding means may be made of ceramics and the first cavity may be profiled to also accommodate the upper holding means. The upper holding means may also be monolithically integral with the holder.

Preferably, the upper holding means is displaced away from the second cavity so as to narrow the cross-section of the connection portion at a position away from the second cavity.

With such construction, the V-grooves are exposed between the upper means and the inner end of the second cavity. The exposed V-grooves serve as guides, thereby facilitating the introduction of the fibers through the second cavity.

Preferably, the upper plate is made of ceramics. The holder may be made of resin or metal.

Preferably, the connector further comprises alignment means having:

(i) an alignment pin;

(ii) an alignment plate; and (iii) two complementary grooves, one profiled in the alignment plate and the other profiled in the top plane surface of the lower plate, so that in combination, the alignment plate and the lower plate firmly hold the alignment pin within the alignment grooves, and the first cavity is profiled to accommodate the alignment means so that the alignment pin is firmly held in place.

By providing such an alignment, the optical fiber connectors can be aligned with each other with high accuracy.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

First Embodiment

Figure 1:
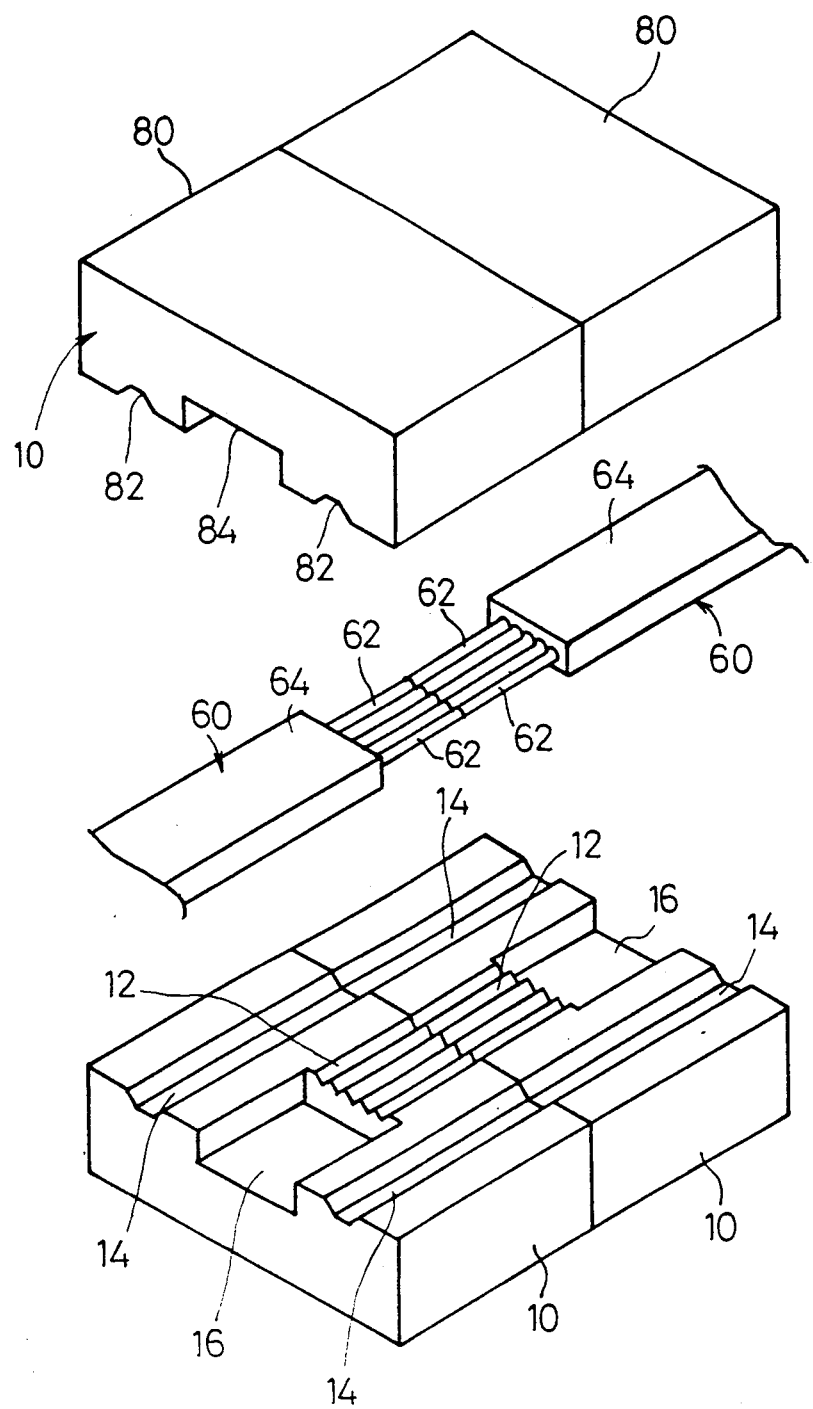
FIG. 1 is a schematic exploded perspective view showing a conventional optical fiber connector.
Figure 2:
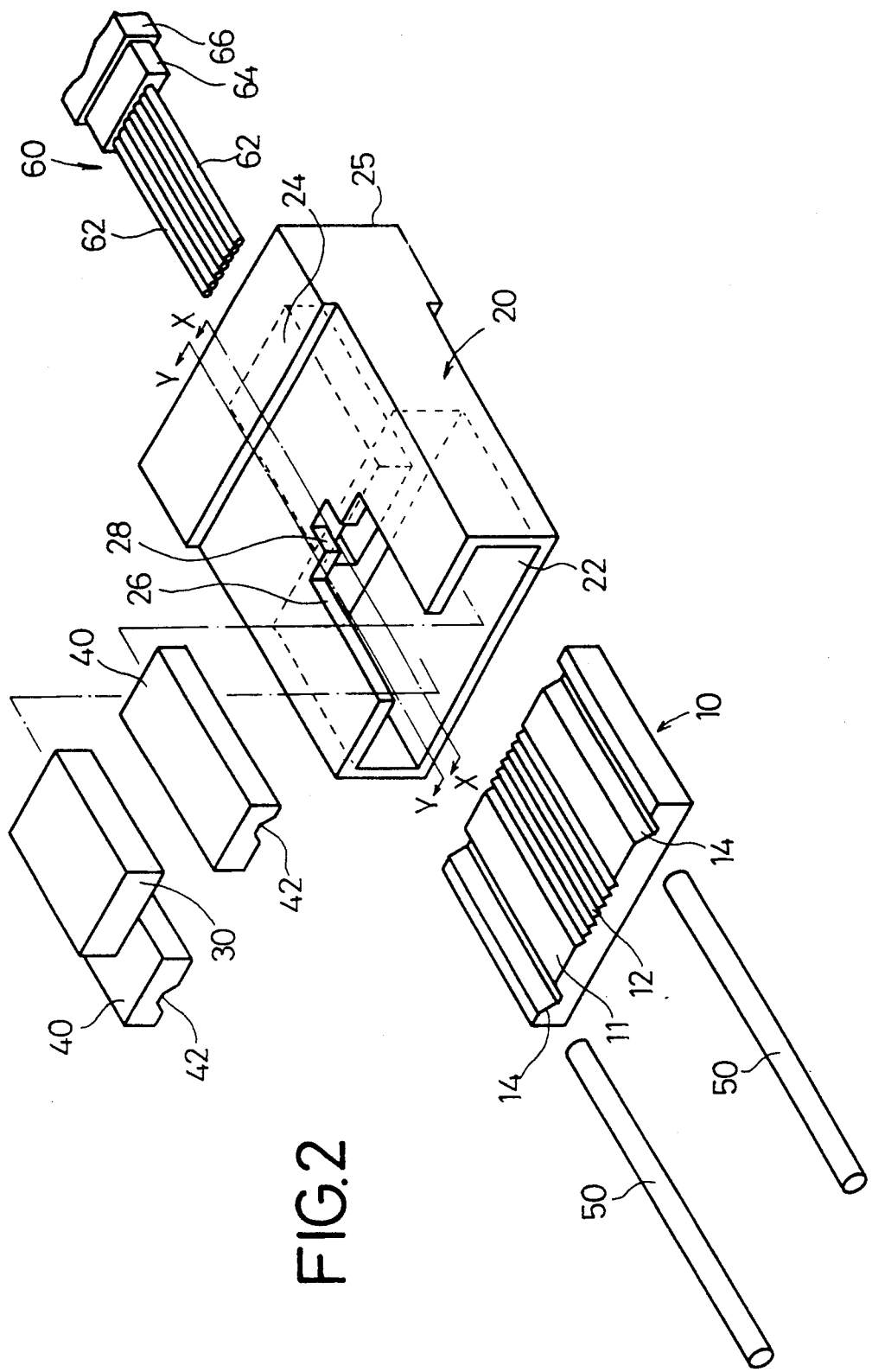
FIG. 2 is a schematic exploded perspective view showing an optical fiber connector according to a first embodiment of the present invention.
Figure 3:
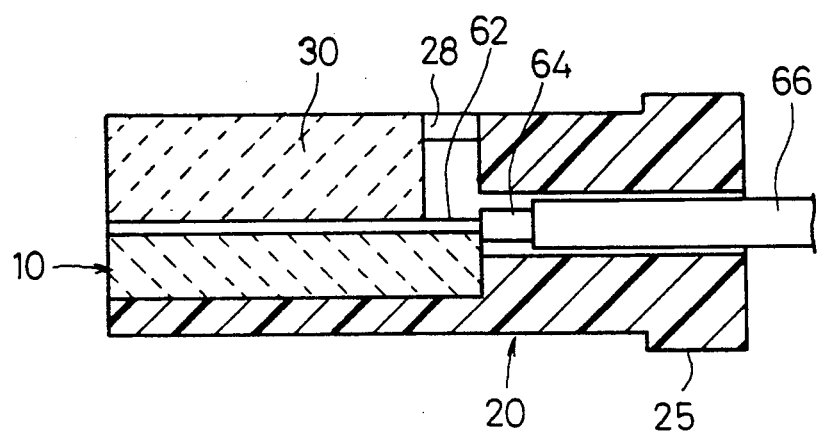
FIG. 3 is a cross-sectional view taken along a line X-X in FIG. 2.
Figure 4:
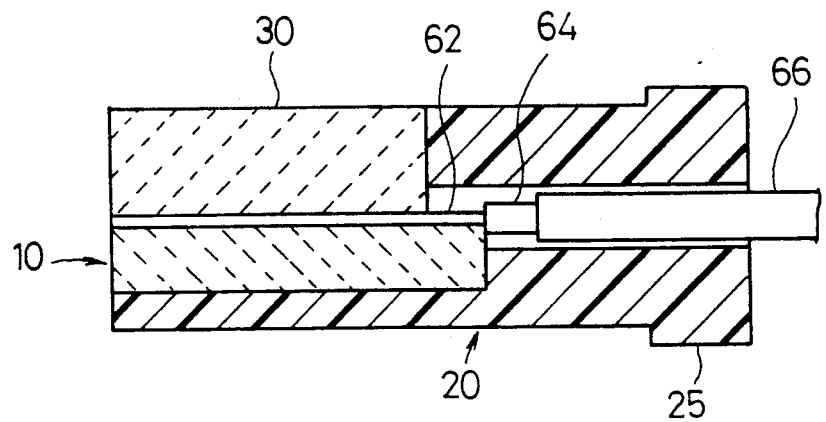
FIG. 4 is a cross-sectional view taken along a line Y-Y in FIG. 2.

Referring to FIGS. 2 to 5, an optical fiber connector according to a first embodiment of the present invention comprises a lower ceramics plate 10 having a plurality of V-grooves 12 each adapted for holding each of optical fibers 62 of a tape-like fiber cable 60 in line, and alignment grooves 14 for holding an alignment pins 50; a ceramics holding plate 30 for holding the optical fibers 62 in said V-grooves 12; a ceramics alignment plate 40 for supporting the alignment pin 50 at three points by cooperation with opposed wall surfaces constituting the alignment groove 14; and a resinous socket 20 which is a holder.

Figure 5:
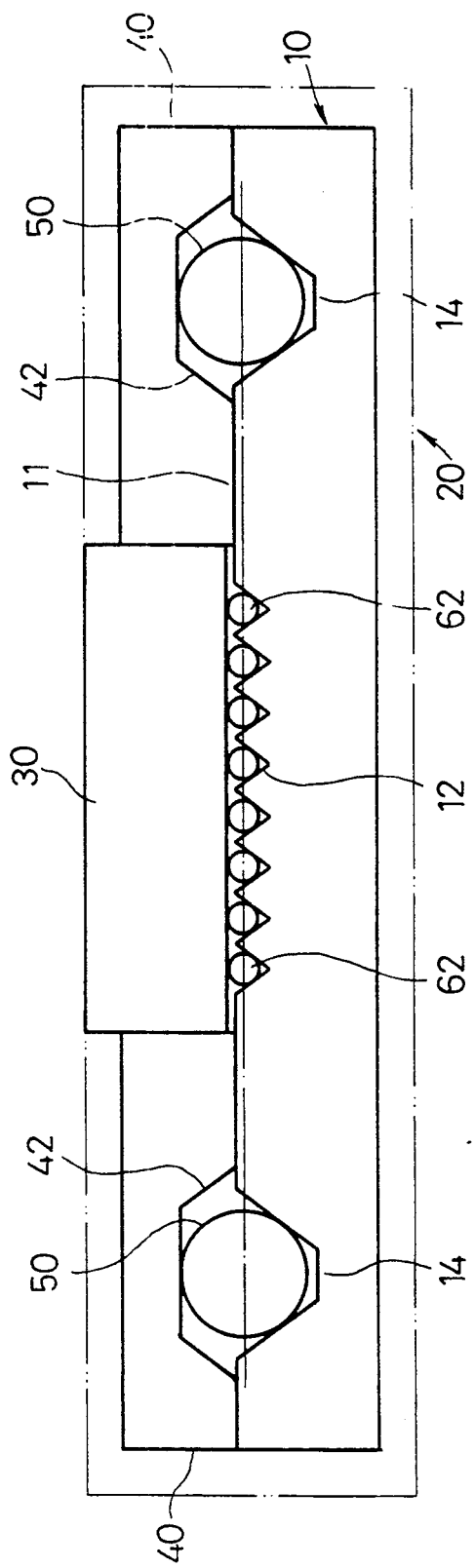
FIG. 5 is an enlarged front view of the optical fiber connector according to the first embodiment of the present invention.

The lower ceramics plate 10 has a top plane surface 11, the plurality of grooves 12 provided at its central portion, and the alignment grooves 14 which are provided in the top plane surfaces 11 on the opposite sides of the V-grooves 12 and into which the alignment pins 50 are to be inserted. The holding plate 30 is of a planar plate-like configuration, and the alignment plates 40 abut against opposite sides of the holding plate SO. The alignment plate 40 is of a substantially planar plate-like configuration and has an alignment groove 42 provided in its bottom surface and corresponding to the respective alignment grooves 14 in the lower ceramics plate 10. The alignment groove 42 is profiled in an asymmetric relation to the alignment groove 14. As shown in FIG. 5, the alignment pins 50 inserted between the alignment grooves 14 and 42 are disposed so that its center is located on the same phantom center line as the center of the optical fiber 62 inserted in the V-grooves 12.

The resinous socket 20 is monolithically formed from a resin material and provided at one end thereof with a flange portion 25. The resinous socket 20 includes a cavity 22 cut away inwardly from an end distal from the flange portion 25 for accommodating the lower ceramics plate 10, the holding plate 30 and the alignment plates 40; and a cavity 24 cut away from an end adjacent the flange portion 25 for accommodating a covering portion 64 of the optical fiber cable 60 and a rubber cover 66 for protecting the covering portion 64. The resinous socket 20 is provided with an opening 26 made by cutting-away of a portion corresponding to the holding plate 30, and an adhesive injecting port 28 communicating with an end of the opening 26.

A method for assembling the optical fiber connector constructed in the above manner will be described below.

The alignment plates 40 are disposed on the lower ceramics plate 10. In this condition, the lower ceramics plate 10 and the alignment plate 40 are inserted into the cavity 22 in the resinous socket 20. Then, each of the alignment pins 50 is integrally inserted between the respective alignment grooves 14 of the lower ceramics plate 10 and the respective alignment grooves 42 of the alignment plate 40 to position the alignment plate 40. Further, the optical fiber cable 60 is inserted from the rearward of the cavity 24, so that the optical fibers 62 are inserted into the V-grooves 12 in the lower ceramics plate 10, and the covering portion of the optical fiber cable 60 and the rubber cover 66 are inserted into the cavity 24 in the resinous socket 20.

Then, the holding plate 30 is placed onto the optical fibers 62, thereby supporting each of the optical fibers 62 at three points by cooperation of the holding plate 30 with the opposite side surfaces of corresponding one of the V-grooves 12 (see FIG. 5). In this condition, a resin-based adhesive is supplied through the adhesive injecting port 28 into the resinous socket 20, thereby securing the lower ceramic plate 10, the holding plate 30 and the alignment plate 40 to one another and within the cavity 22, while at the same time, securing the optical fibers 62 within the V-grooves 12. In addition, the covering portion 64 of the optical fiber cable 60 and the rubber cover 66 are secured within the cavity 24 in the resinous socket 20, thus completing the optical fiber connector assembling operation.

In the present embodiment, the lower ceramics plate 10, the holding plate 30 and the alignment plate 40 which are parts required for positioning the optical fibers 62 are made of ceramics. Therefore, the V-grooves 12 and the alignment grooves 14 in the lower ceramics plate 10 and the alignment grooves 42 in the alignment plates 40 can be machined with high accuracy, thereby effectively inhibiting the generation of a connection loss and reducing a variation in connection loss as much as possible due to a variation in temperature or the like. Additionally, it is possible to support each of the optical fibers 62 with high accuracy at three points by the bottom surface of the holding plate 30 and the opposite wall surfaces constituting the V-grooves 12, leading to improved accuracy of positioning of the optical fibers 62.

Moreover, the cavity 24 for accommodating and securing the parts not required for positioning of the optical fibers 62, i.e., the covering portion 64 of the optical fiber cable 60 and the rubber cover 66 is provided in the resinous socket 20 which is relatively inexpensive in machining cost. Therefore, it is possible to reduce expensive machining costs as much as possible, leading to a reduced total manufacturing cost for the optical fiber connector.

Further, not only the covering portion 64 of the optical fiber cable 60 but also the rubber cover 66 are secured within the cavity 24 in the resinous socket 20, thereby making it possible to prevent the breakage of the optical fiber cable 60 or the like. In addition, since the adhesive injecting port 28 is provided in the resinous socket 20 itself, an adhesive can be smoothly filled into the resinous socket 20, thereby reliably securing the entire optical fiber connector and the optical fiber cable 60.

Second Embodiment

Figure 6:
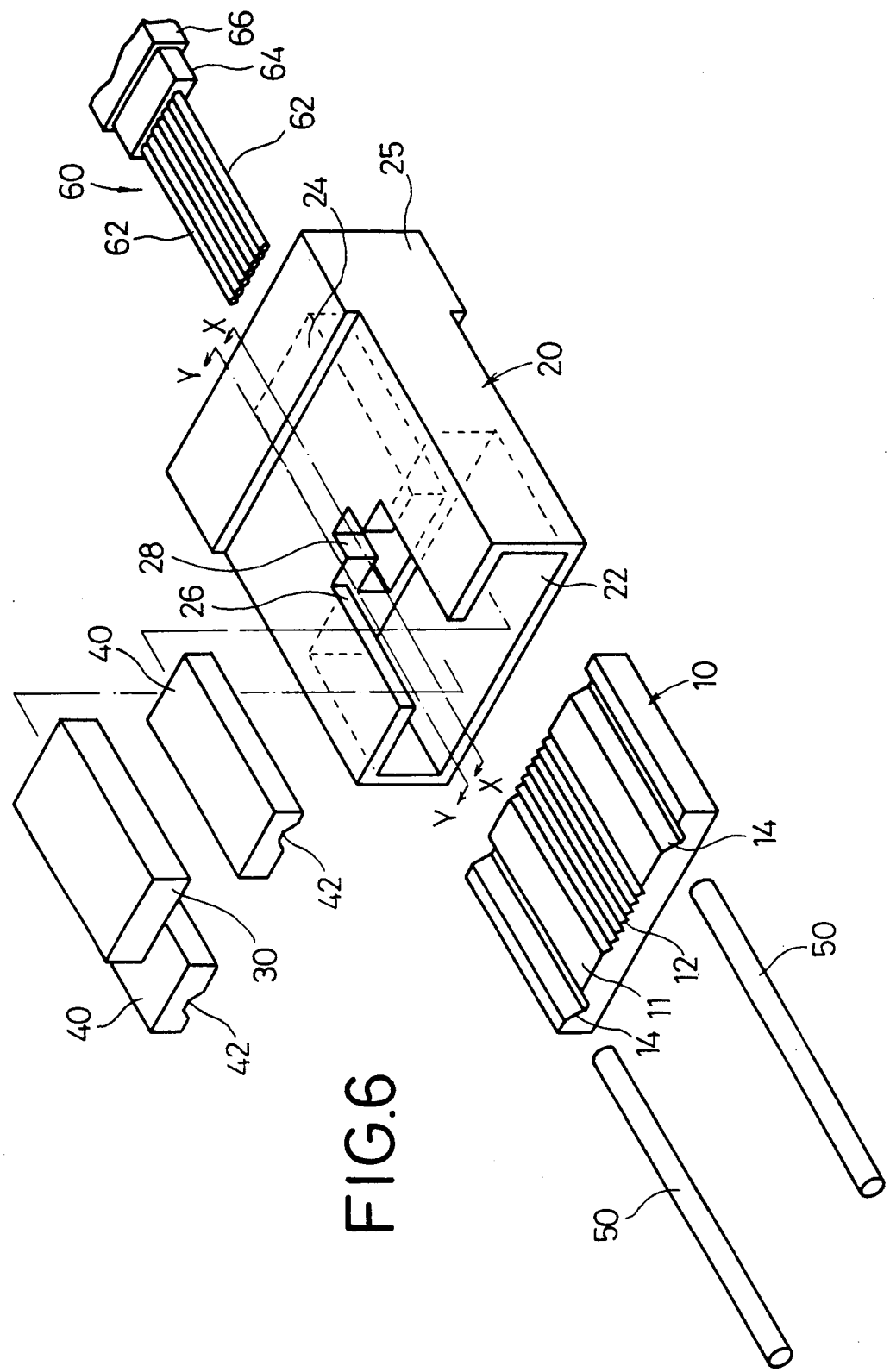
FIG. 6 is schematic exploded perspective view showing an optical fiber connector according to a second embodiment of the present invention.
Figure 7:
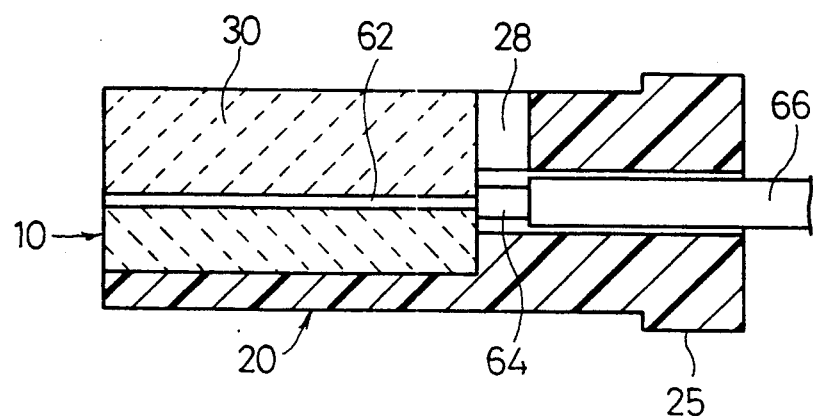
FIG. 7 is cross-sectional view taken along a line X—X in FIG. 6.
Figure 8:
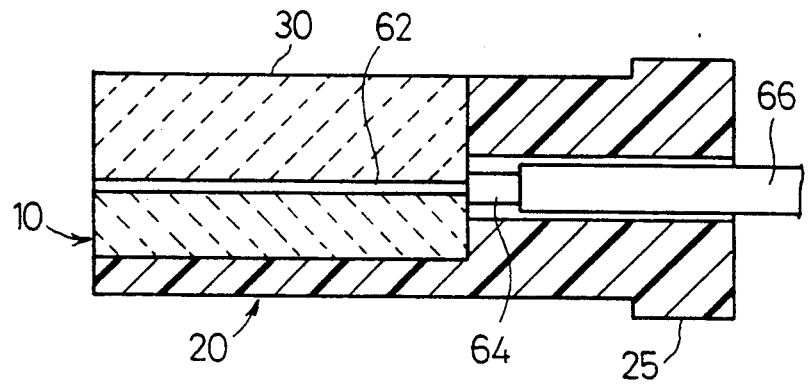
FIG. 8 is a cross-sectional view taken along a line Y—Y in FIG. 6.

Referring to FIGS. 6, 7 and 8, an optical fiber connector according to a second embodiment of the present invention will now be described.

The second embodiment differs from the first embodiment in that the holding plate 30 is shorter in length than the lower ceramics plate 10 in the first embodiment, whereas the holding plate 30 has the same length as the lower ceramics plate 10 in the second embodiment. The other arrangements in the second embodiment are the same as those in the first embodiment.

Third Embodiment

Figure 9:
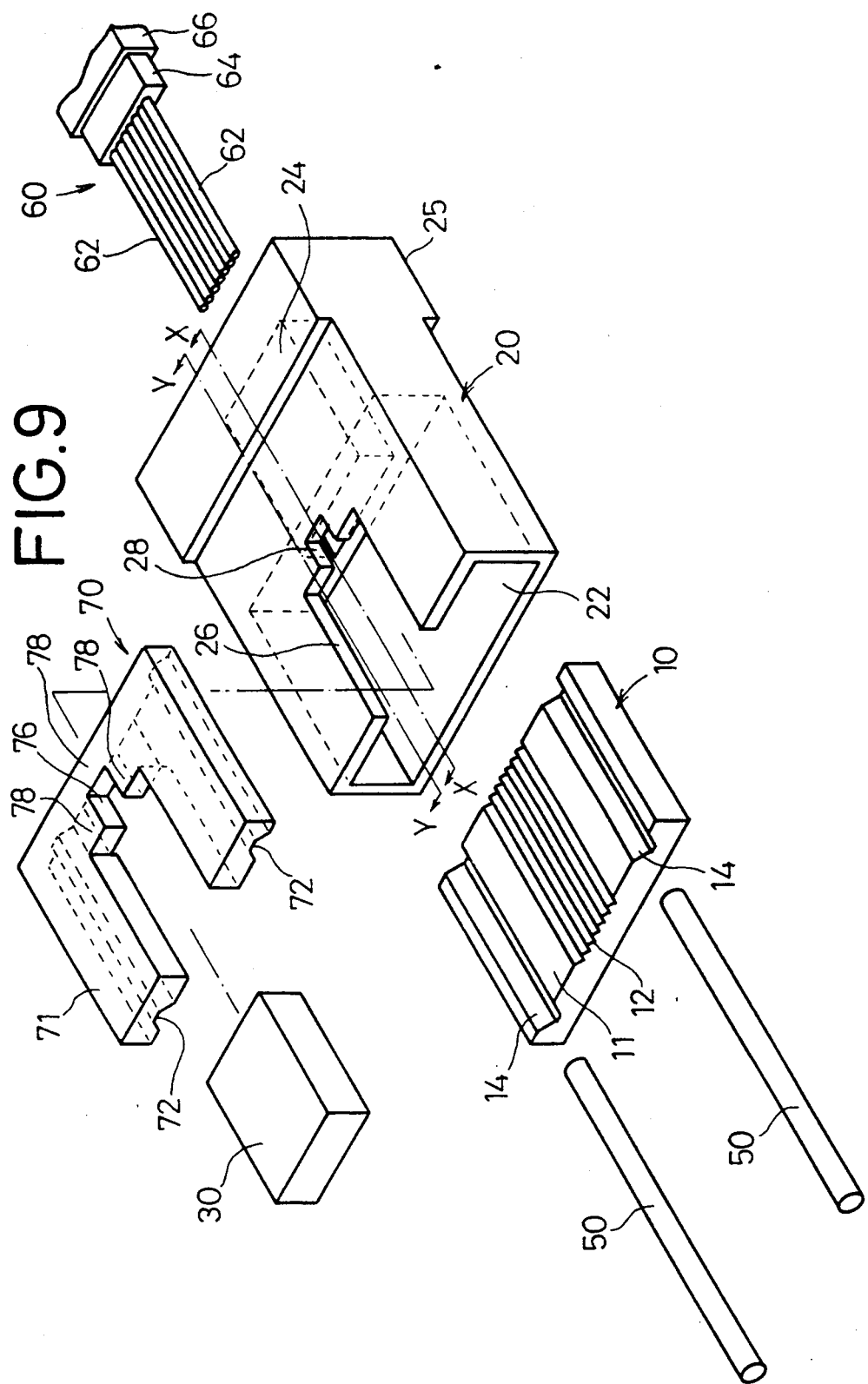
FIG. 9 is a schematic exploded perspective view showing an optical fiber connector according to a third embodiment of the present invention.
Figure 10:
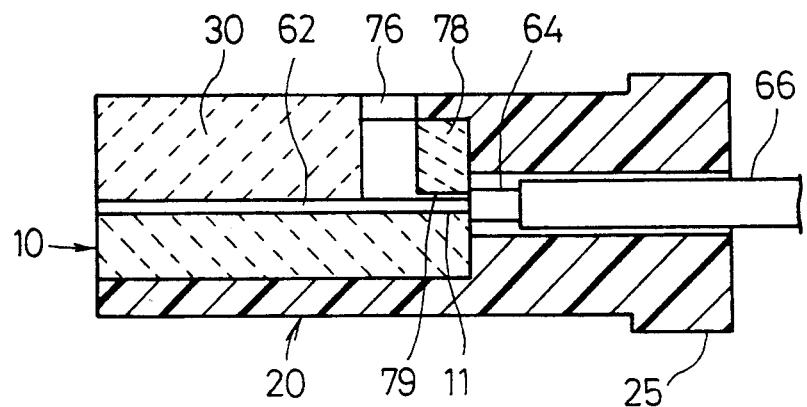
FIG. 10 is a cross-sectional view taken along a line X—X in FIG. 9.
Figure 11:
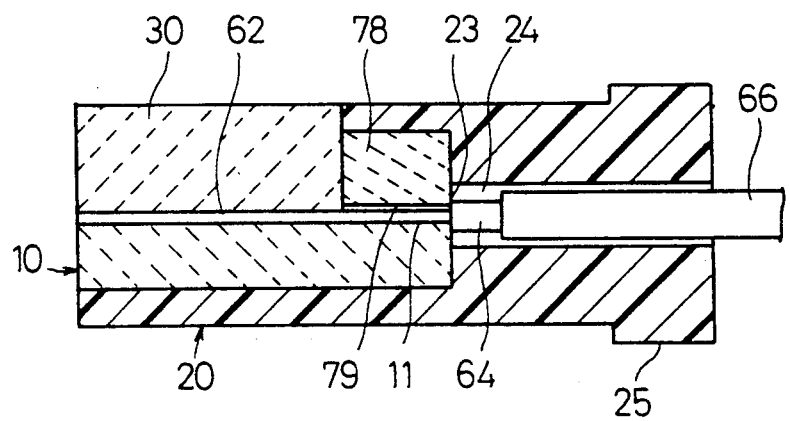
FIG. 11 is a cross-sectional view taken along a line Y—Y in FIG. 9.

Referring to FIGS. 9, 10 and 11, an optical fiber connector according to a third embodiment of the present invention will now be described.

The third embodiment differs from the first embodiment in that the alignment plate 40 in the first embodiment is replaced by an alignment plate 70. The other arrangements in the third embodiment are the same as those in the first embodiment. Alignment portions 71 are provided on opposite sides of the alignment plate 70, so that inner side surfaces of the alignment portion 71 abuts against side surfaces of the holding plate 30. Alignment grooves 72 corresponding to the alignment grooves 14 are provided in bottom surfaces of the alignment portions 71. An upper holding portion 78 is provided in rear of the alignment plate 70 between the two alignment portions 71. A bottom surface 79 of the upper holding portion 78 is flat, and spaced apart from the top plane surface 11 of the lower ceramics plate 10 by a distance less than the diameter of the optical fibers 62. Each of the optical fiber 62 is loosely held and temporarily fixed within the V-groove 12 by both of the upper holding portion 78 and the V-groove 12 in the lower ceramics plate 10. An adhesive injecting port 76 is provided in a central portion of the upper holding portion 78.

In the present embodiment, the alignment plate 70 is first placed on the lower ceramics plate 10, and the two alignment pins 50 are placed between the alignment grooves 14 and 72. In this condition, the lower ceramics plate 10 and the alignment plate 70 are inserted into the cavity 22 in the resinous socket 20. Then, the optical fiber cable 60 is inserted from the rearward of the cavity 24, so that the optical fibers 62 are inserted into the V-grooves 12 in the lower ceramics plate 10. At this time, the rear portions of the optical fibers 62 are loosely held and temporarily fixed within the V-grooves by both of the rear portions of the V-grooves 12 and the bottom surface of the upper holding portion 78. Thereafter, the holding plate 30 is placed onto the optical fibers 62, thereby supporting each of the optical fibers 62 by both of the holding plate 30 and the opposite side surfaces of the V-groove 12. In this condition, a resin-based adhesive is supplied through the adhesive injecting ports 28 and 76 into the resinous socket 20, thereby securing the lower ceramics plate 10, the holding plate 30 and the alignment plate 70 to one another and to an inner wall surface of the resinous socket 20, while at the same time, securing the optical fibers 62 within the V-grooves 12. In addition, the covering portion 64 of the optical fibers 62 and the rubber cover 66 are secured within the cavity 24 in the resinous socket 20.

In this embodiment, the optical fibers 62 can be temporarily fixed in the V-grooves 12 by loosely holding them by both of the upper holding portion 78 and the V-grooves 12 in the lower ceramics plate 10 located therebelow. This eliminates the need for temporarily fixing the optical fibers 62 by an adhesive tape, a doublesided adhesive tape or the like before the optical fibers 62 are fixed within the V-grooves 12 by the holding plate 30, thereby ensuring that the optical fibers 62 can be easily secured.

Fourth Embodiment

Figure 12:
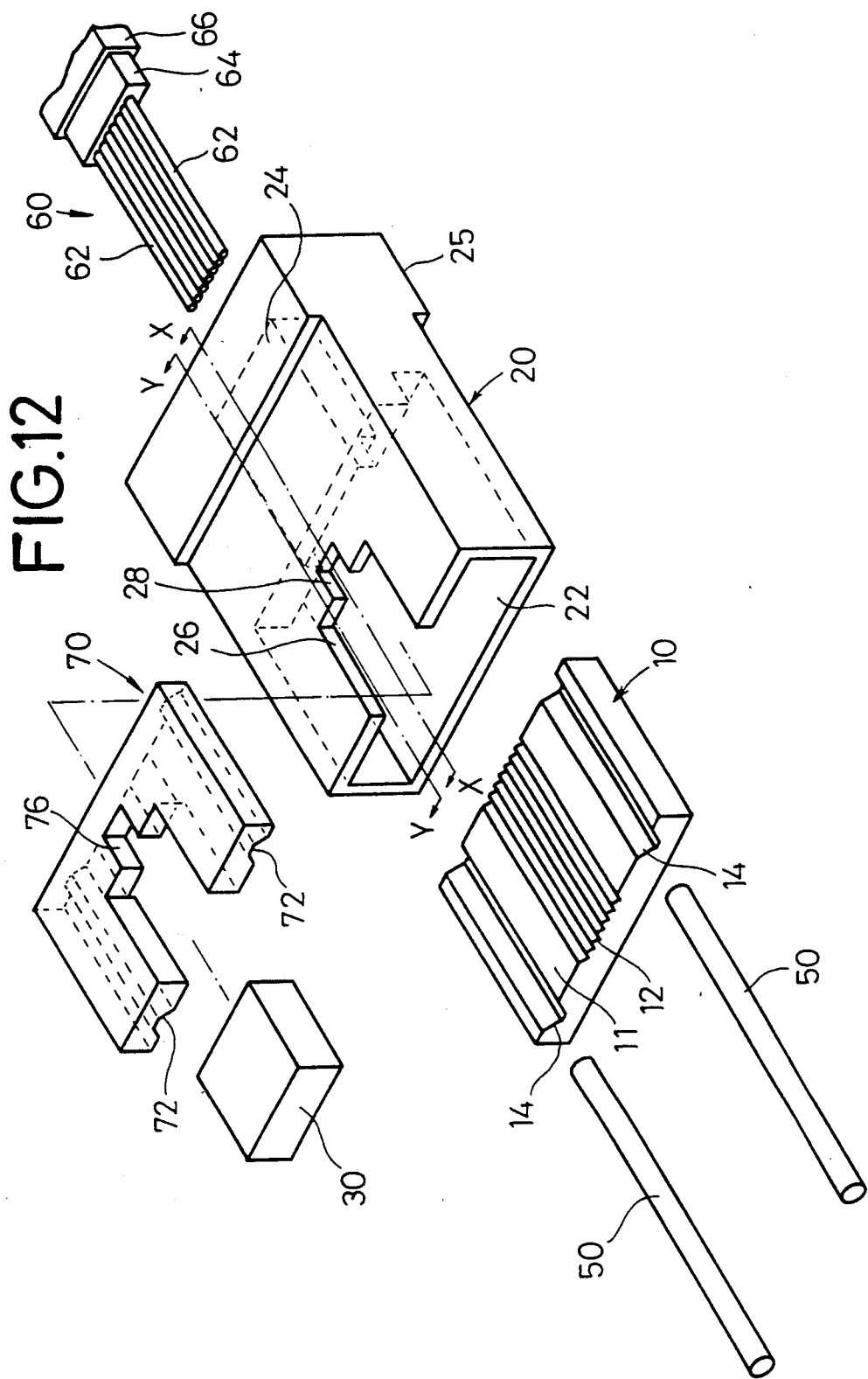
FIG. 12 is a schematic exploded perspective view showing an optical fiber connector according to a fourth embodiment of the present invention.
Figure 13:
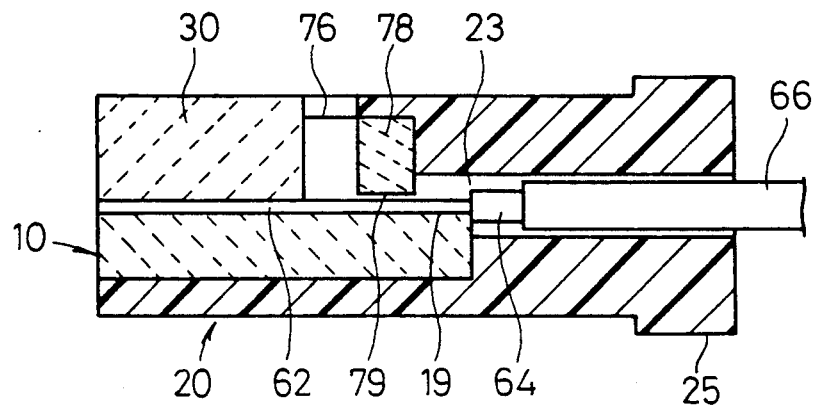
FIG. 13 is a cross-sectional view taken along a line X—X in FIG. 12.
Figure 14:
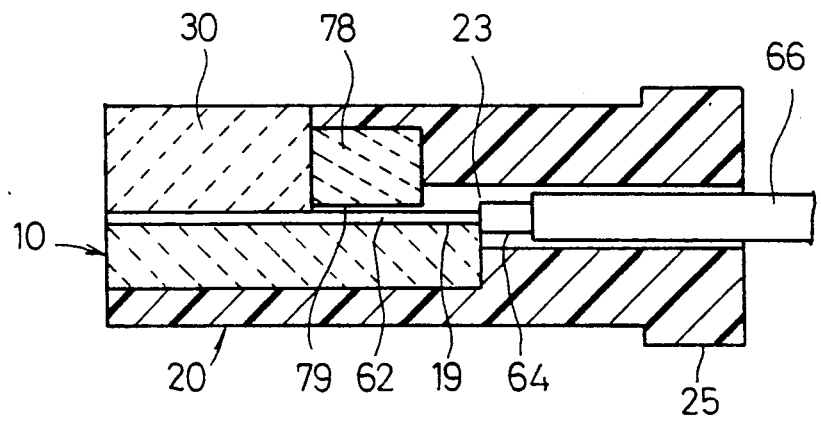
FIG. 14 is a cross-sectional view taken along a line Y—Y in FIG. 13.

Referring to FIGS. 12, 13 and 14, an optical fiber connector according to a fourth embodiment of the present invention will now be described.

This fourth embodiment differs from the third embodiment in that in the third embodiment, the upper holding portion 78 is provided so that its rear end is located at the same position as the rear portion of the lower ceramics plate 10 and so that the rear end of the upper holding portion 78 comes into contact with an inner end 23 of the cavity 24, whereas in the fourth embodiment, the upper holding portion 78 is displaced away from the inner end 23 of the cavity 24, so that the V-grooves 12 are exposed between the upper holding portion 78 and the inner end 23 of the cavity 24. The other arrangements in the fourth embodiment are the same as those in the third embodiment.

In the fourth embodiment, since the V-grooves 12 are exposed between the upper holding portion 78 and the inner end 23 of the cavity 24, the exposed V-grooves 12 serve as guides, thereby facilitating the introduction of the optical fibers 62 into the V-grooves 12 below the upper holding portion 78.

Fifth Embodiment

Figure 15:
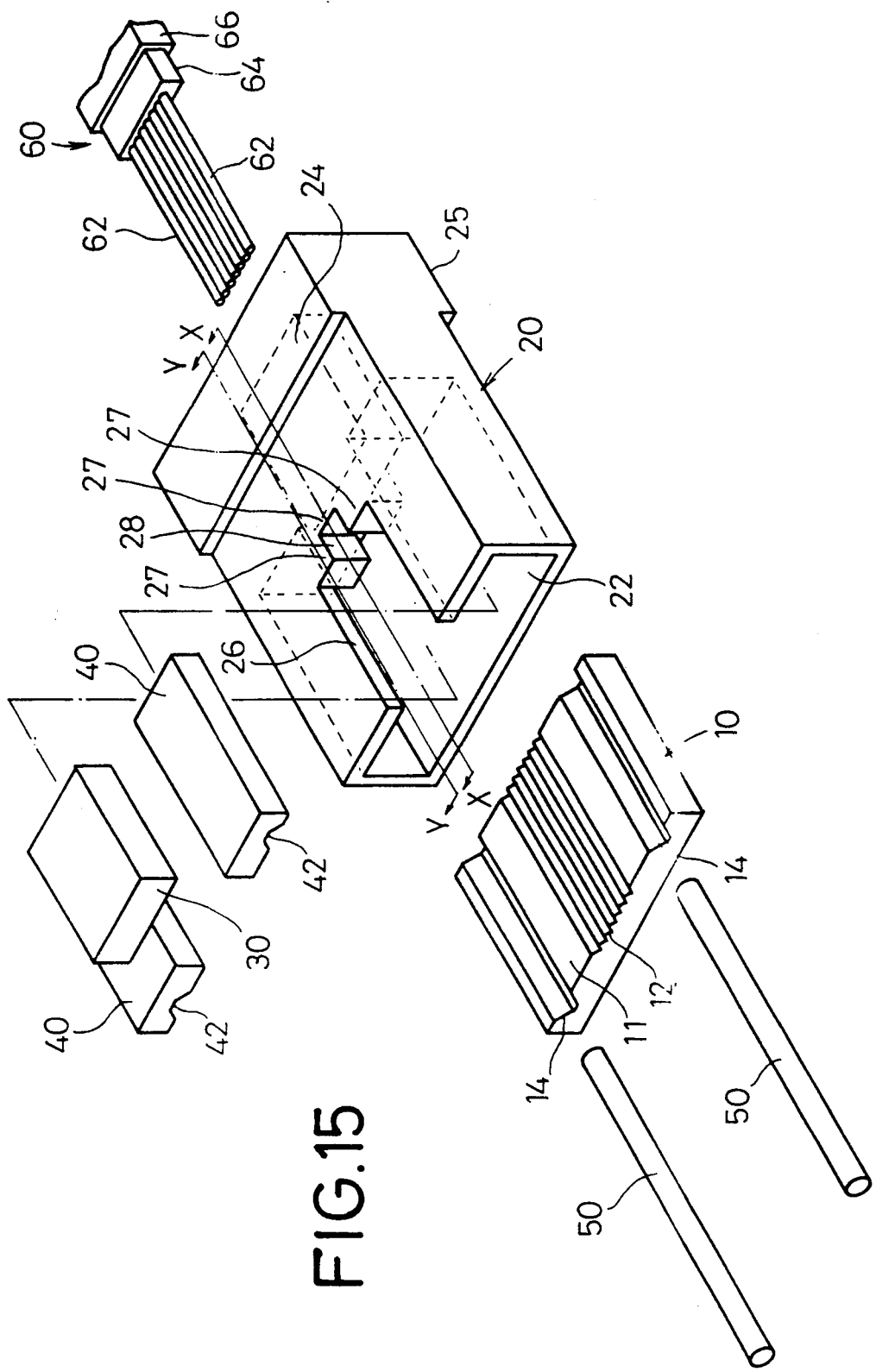
FIG. 15 is a schematic exploded perspective view showing an optical fiber connector according to a fifth embodiment of the present invention.
Figure 16:
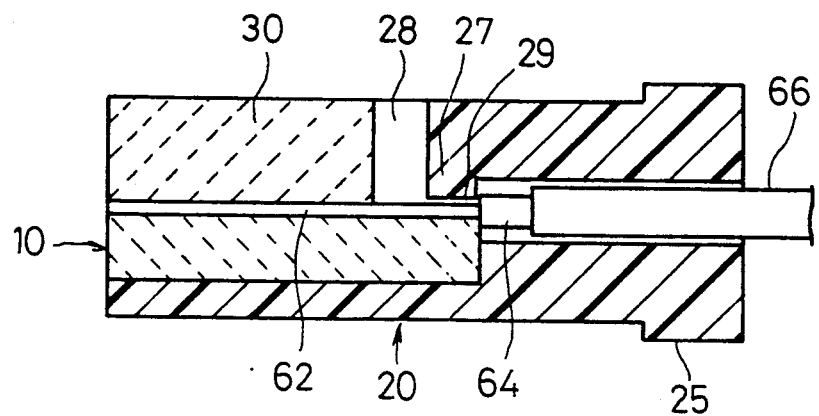
FIG. 16 is a cross-sectional view taken along a line X—X in FIG. 15.
Figure 17:
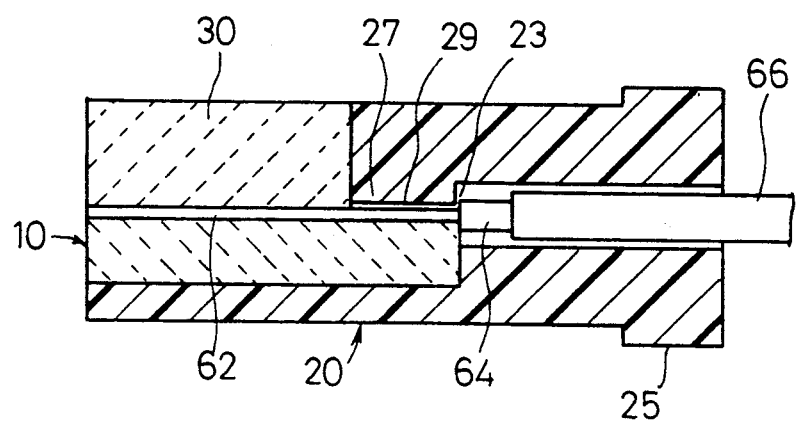
FIG. 17 is a cross-sectional view taken along a line Y—Y in FIG. 15.

Referring to FIGS. 15, 16 and 17, an optical fiber connector according to a fifth embodiment of the present invention will now be described.

The fifth embodiment differs from the third embodiment in that in the third embodiment, the optical fibers 62 are temporarily fixed by loosely holding them within the V-grooves 12 by both of the upper holding portion 78 provided in rear of the alignment plate 70 and the V-grooves 12 provided below the upper holding portion 78, whereas in the fifth embodiment, the optical fibers 62 are temporarily fixed by loosely holding them within the V-grooves 12 by both the upper holding portion 27 formed monolithically with the resinous socket 20 and the V-grooves 12 provided below the upper holding portion 27 and in that the alignment plate 70 in the third embodiment is replaced by alignment plates 40 similar to those in the first embodiment. The other arrangements in the fifth embodiment are the same as in the third embodiment. Ways for placing and fixing the optical fibers 62 into the V-grooves 12 are also similar to those in the third embodiment. The bottom surface 29 of the upper holding portion 27 is flat and spaced apart from the top plane surface 11 of the lower ceramics plate 10 by a certain distance less than the diameter of the optical fiber 62. Also in the fifth embodiment, the optical fibers 62 can be loosely and temporarily fixed within the V-grooves 12 by both of the upper holding portion 27 and the V-grooves 12 provided therebelow, and hence, there is eliminated the need for temporarily fixing the optical fibers 62 by an adhesive tape, a double-sided adhesive tape or the like, before the optical fibers 62 are fixed within the V-grooves 12 by the holding plate 30, thereby ensuring that the optical fibers 62 can be easily secured.

Sixth Embodiment

Figure 18:
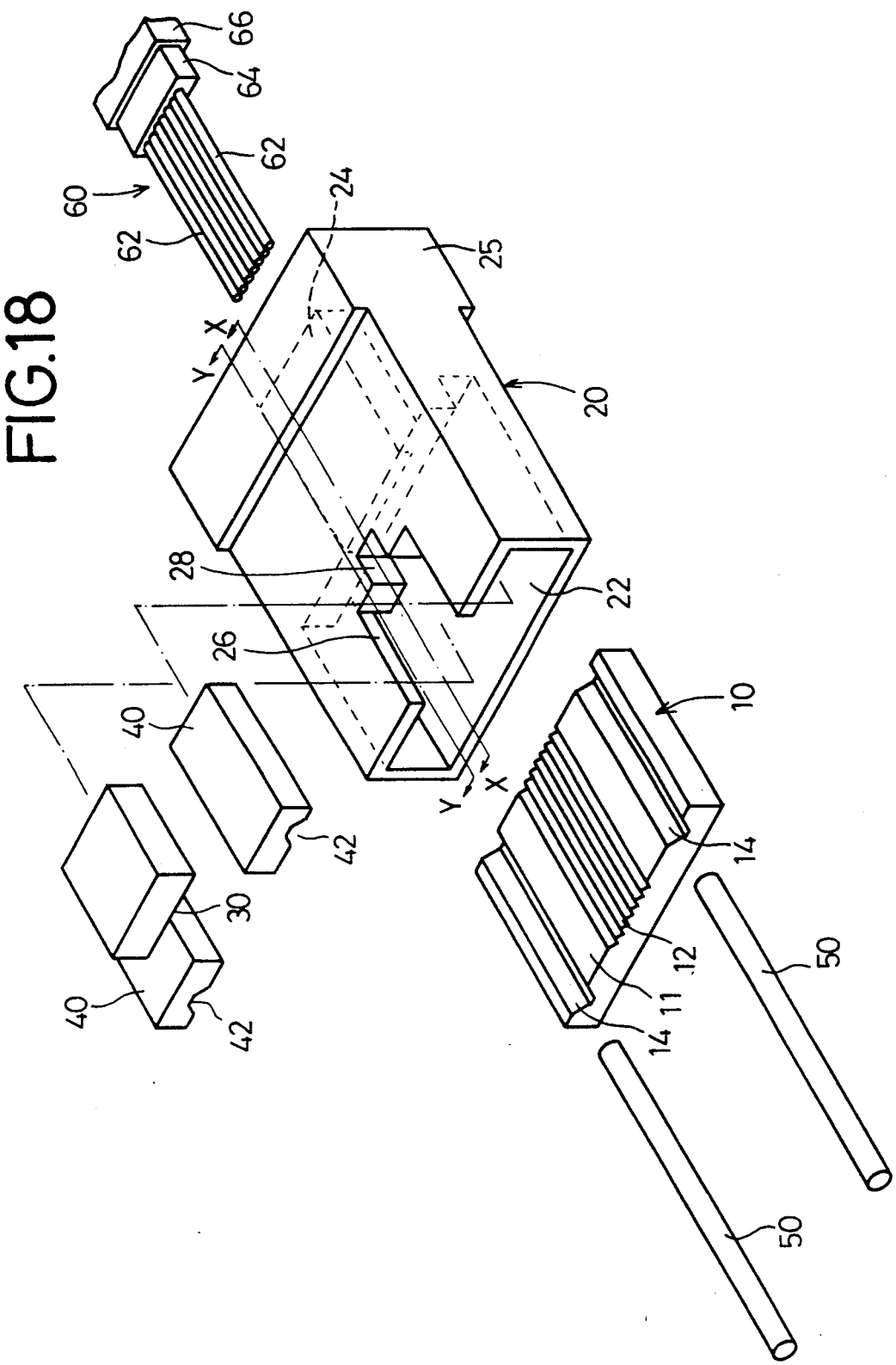
FIG. 18 is a schematic exploded perspective view showing an optical fiber connector according to a sixth embodiment the present invention.
Figure 19:
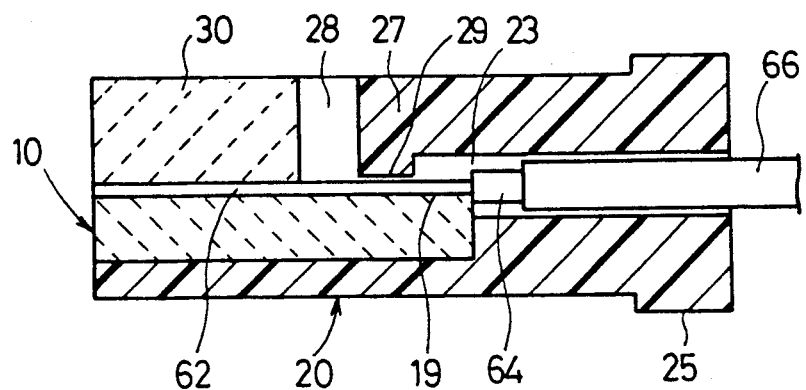
FIG. 19 is a cross-sectional view taken along a line X—X in FIG. 18.
Figure 20:
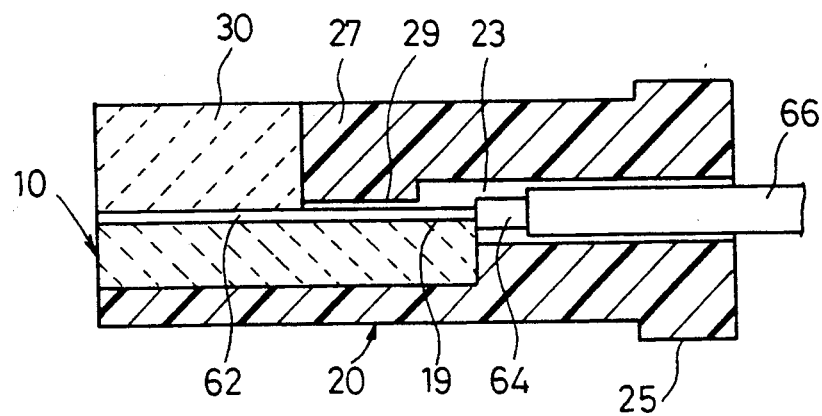
FIG. 20 is a cross-sectional view taken along a line Y—Y in FIG. 18.

Referring to FIGS. 18, 19 and 20, an optical fiber connector according to a sixth embodiment of the present invention will now be described.

The sixth embodiment differs from the fifth embodiment in that in the fifth embodiment, the upper holding portion 78 is provided so that its rear end is located at the same position as the rear portion of the lower ceramics plate 10 and so that the rear end of the upper holding portion 78 comes into contact with an inner end 23 of the cavity 24, whereas in the sixth embodiment, the upper holding portion 27 is displaced away from the inner end 23 of the cavity 24, so that the V-grooves 12 are exposed between the upper holding portion 27 and the inner end 23 of the cavity 24. The other arrangements in the fourth embodiment are the same as those in the third embodiment.

In the sixth embodiment, since the V-grooves 12 are exposed between the upper holding portion 27 and the inner end 23 of the cavity 24, the exposed V-grooves 12 serve as guides, thereby facilitating the introduction of the optical fibers 62 into the V-grooves 12 below the upper holding portion 78.

Seventh Embodiment

Figure 21:
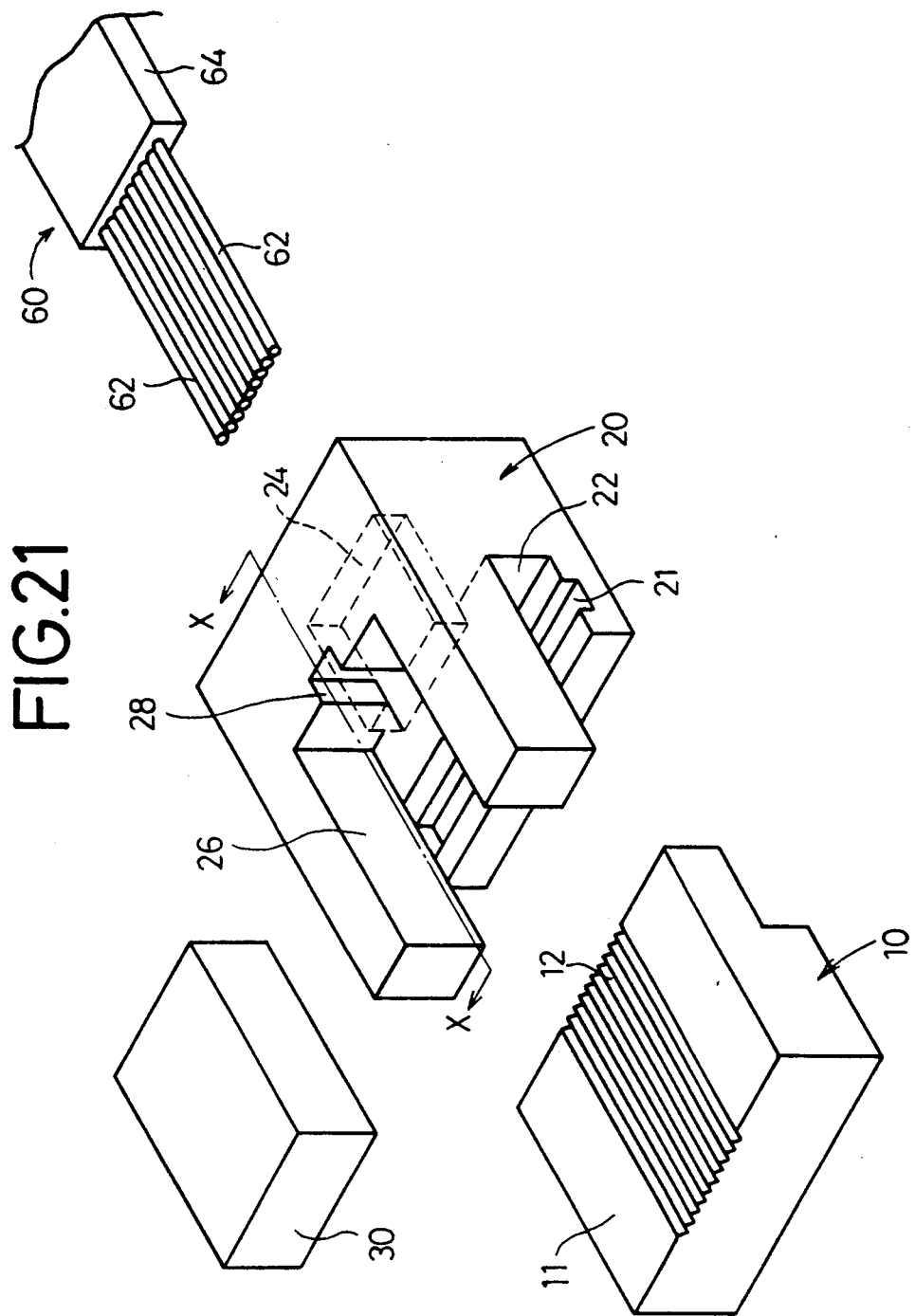
FIG. 21 is a schematic exploded perspective view showing an optical fiber connector according to a seventh embodiment of the present invention.
Figure 22:
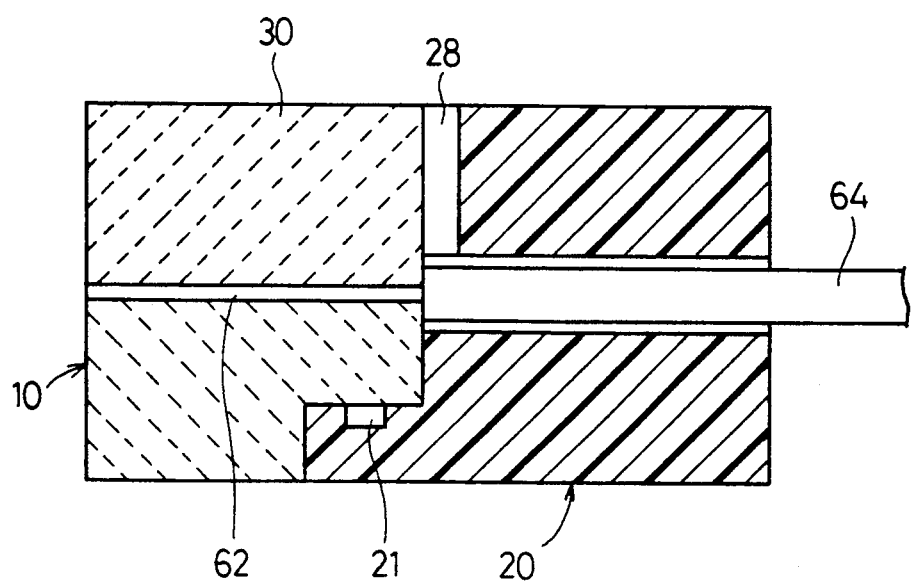
FIG. 22 is a cross-sectional view taken along a line X—X in FIG. 21.

Referring to FIGS. 21, 22 and 23, an optical fiber connector according to a seventh embodiment of the present invention will now be described.

The optical fiber connector in this embodiment is used for connection of an optical fiber cable with a light receiving element, a light emitting element or an LN (lithium niobate) waveguide, and comprises a lower ceramics plate 10 having V-grooves 12 provided therein, a holding ceramics plate 30 for holding a plurality of optical fibers of an optical fiber cable 60 in the V-grooves, respectively, and a resinous socket 20 which is a holder.

The resinous socket 20 includes a cavity 22 capable of accommodating the lower ceramics plate 10, and a cavity 24 which communicates at one end with the cavity 22 and is open at the other end to the outside and which is capable of accommodating a covering portion 64 of the optical fiber cable 60. The resinous socket 20 is provided with a first adhesive injecting port 21 communicating with opposite side surfaces of the cavity 22, and a second adhesive injecting port 28 communicating with an upper portion of the cavity 22.

In the optical fiber connector constructed in this manner, the lower ceramics plate 10 is inserted into the cavity 22 in the resinous socket 20. Then the optical fiber cable 60 is inserted from the rearward of the cavity 24, so that the optical fibers 62 are inserted into the V-grooves 12 in the lower ceramics plate 10, and the covering portion 64 for the optical fiber cable 60 is inserted into the cavity 24. The holding plate 30 is then placed onto the optical fibers 62, thereby supporting each of the optical fibers 62 at three points by both of the holding plate 30 and the opposite side surfaces of the V-groove 12. In this condition, an adhesive is supplied through the first and second adhesive injecting ports 21 and 28, thereby securing the covering portion 64 within the cavity 24, while at the same time, securing the optical fibers 62 in the V-grooves 12.

Also in this embodiment, the lower ceramics plate 10 having the V-grooves 12 provided therein and the holding plate 30 are formed from ceramics, and the cavity 24 for accommodating the covering portion 64 of the optical fiber cable 60 is provided in the resinous socket 20. Therefore, it is possible to reduce the machining cost for the optical fiber connector. Moreover, since the first and second adhesive injecting ports 21 and 28 are provided in the resinous socket 20, it is possible to smoothly fill the adhesive into a desired portion, thereby firmly securing the optical fiber connector and the optical fiber cable 60.

It should be noted that the resinous socket 20 has been used as a holder in the above-described first to seventh embodiments, but can be replaced by a metal socket. The metal socket is less influenced by an environment in which it is used, and especially, the use of the metal socket makes it possible to avoid the pollution due to the generation of a gas or the like.

What is claimed is:

1. An optical fiber connector for a plurality of optical fibers, each optical fiber having a covered portion, comprising:
    a lower ceramics plate with a top plane surface having a plurality of V-grooves, each V-groove for respectively holding one optical fiber;
    an upper plate, in combination with said lower ceramics plate, for firmly holding the optical fibers in said V-grooves;
    a holder having first and second opposed end portions, wherein a first cavity is profiled in the first end portion to accommodate the combination of said upper plate and said lower ceramics plate, and a second cavity is profiled in the second end portion to accommodate the covered portions of the optical fibers, said first cavity having a connection portion for connecting said first and second cavities to each other such that said optical fibers pass through said connection portion, said connection portion being proximate to an inner end of said second cavity; and
    narrowing means disposed above said lower ceramics plate for loosely holding each optical fiber in its respective V-groove by narrowing a cross section of the connection portion.

2. A connector according to claim 1, wherein said upper plate is made of ceramics.

3. A connector according to claim 1, wherein said holder is made of resin.

4. A connector according to claim 1, wherein said holder is made of metal.

5. The optical fiber connector according to claim 1, wherein said narrowing mean is an element separate from said upper plate.

6. An optical fiber connector for a plurality of optical fibers, each optical fiber having a covered portion, comprising:
    a lower ceramics plate with a top plane surface having a plurality of V-grooves, each V-groove for respectively holding one optical fiber;
    an upper plate, in combination with said lower ceramics plate, for firmly holding the optical fibers in said V-grooves;
    a holder having first and second opposed end portions, wherein a first cavity is profiled in the first end portion to accommodate the combination of said upper plate and said lower ceramics plate, and a second cavity is profiled in the second end portion to accommodate the covered portions of the optical fibers, said first cavity having a connection portion for connecting said first and second cavities such that said optical fibers pass through said connection portion, said connection portion being proximate to an inner end of said second cavity; and
    narrowing means for loosely holding each optical fiber in its respective V-groove by narrowing a cross section of the connection portion, said narrowing means comprising a portion of said V-grooves and an upper holding means disposed above said V-grooves by a distance less than the diameter of the optical fibers, thereby narrowing the cross-section of sad connection portion.

7. A connector according to claim 6, wherein said upper holding means is made of ceramics and said first cavity is profiled to also accommodate said upper holding means.

8. A connector according to claim 6, wherein said upper holding means is monolithically integral with said holder.

9. A connector according to claim 6, wherein said upper holding means is displaced away from said second cavity so as to narrow the cross-section of said connection portion at a position away from said second cavity and to facilitate the introduction of the fibers through said second cavity.

10. An optical fiber connector for a plurality of optical fibers, each optical fiber having a covered portion, comprising:
    a lower ceramics plate with a top plane surface having a plurality of V-grooves, each V-groove for respectively holding one optical fiber;
    an upper plate, in combination with said lower ceramics plate, for firmly holding the optical fibers in said V-grooves;
    a holder having first and second opposed end portions, wherein a first cavity is profiled in the first end portion to accommodate the combination of sad upper plate and said lower ceramics plate, and a second cavity is profiled in the second end portion to accommodate the covered portions of the optical fibers, said first cavity having a connection portion for connecting said first and second cavities such that said optical fibers pass through said connection portion, said connection portion being proximate to an inner end of said second cavity; and
    alignment means including an alignment pin, an alignment plate, and first and second complementary grooves, said first complementary groove being profiled in said alignment plate, and said second complementary groove being profiled in said top plane surface of said lower plate, such that said alignment plate and said lower plate firmly holding said alignment pin within said first and second complementary alignment grooves, said first cavity being profiled to accommodate said alignment plate.

* * * * *